United States Patent Office 3,266,654
Patented August 16, 1966

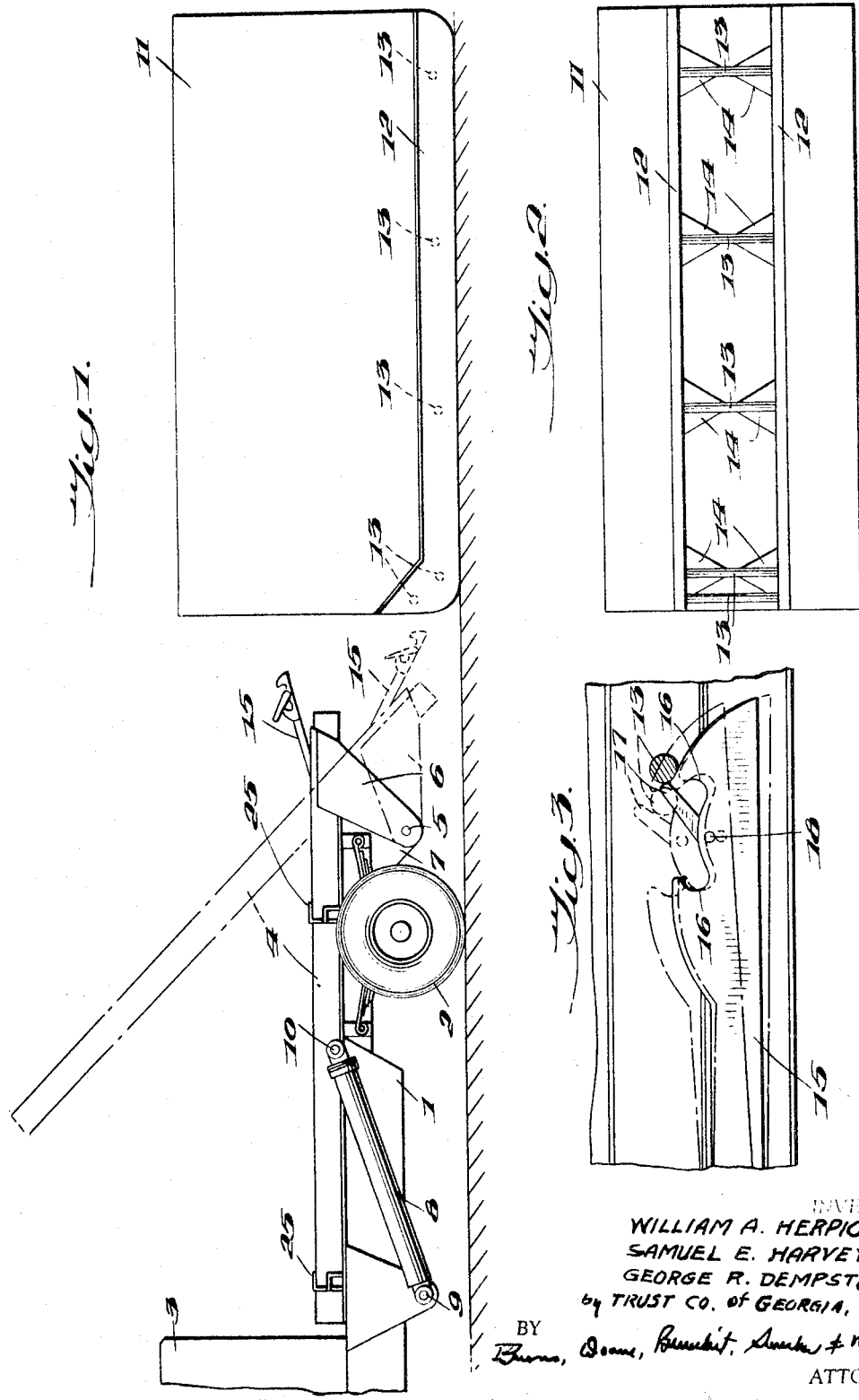

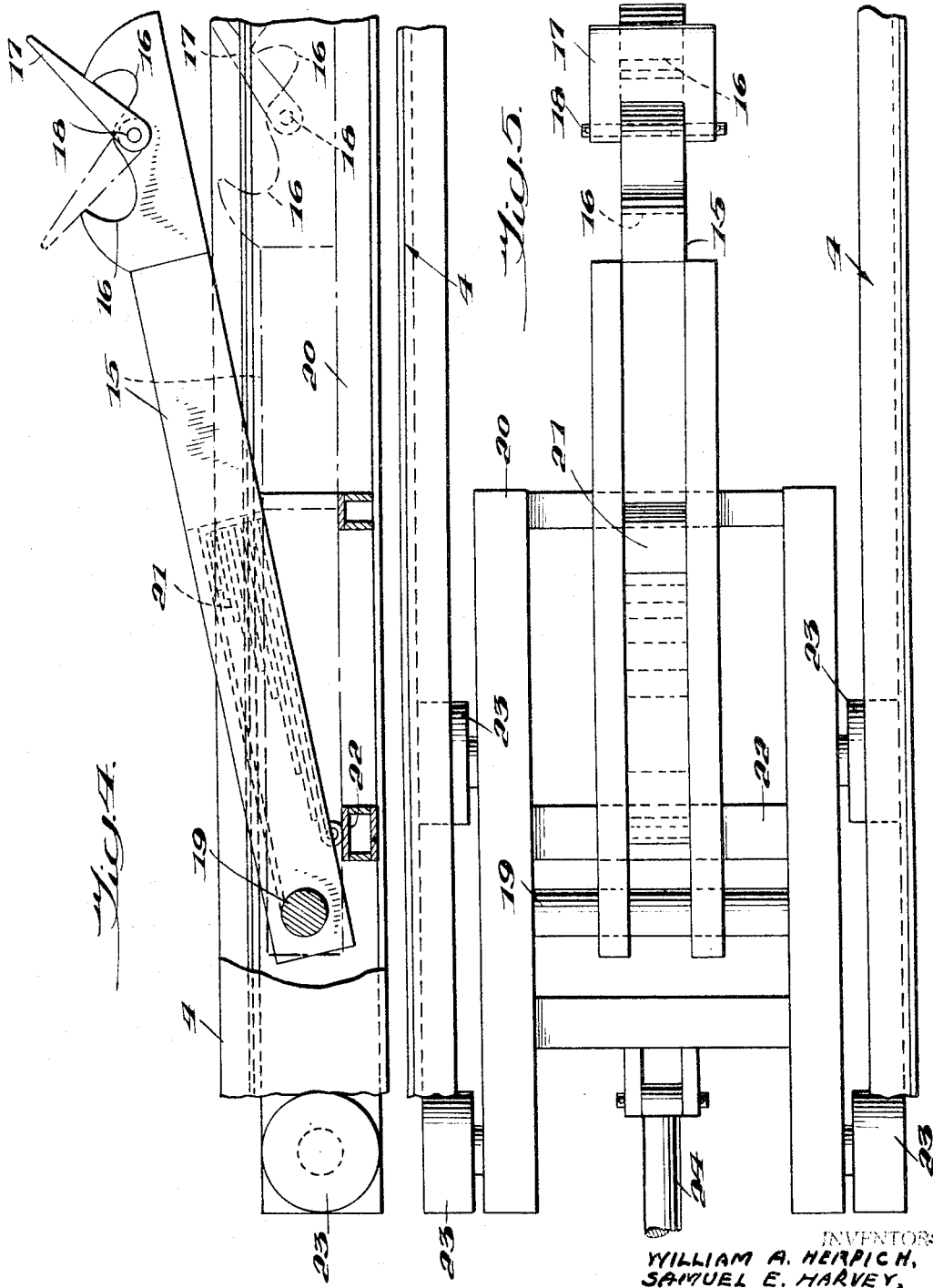

3,266,654
CONTAINERS
William A. Herpich, 739 Hardin Way W., Galion, Ohio, and Samuel E. Harvey, P.O. Box 3127, Knoxville, Tenn., and George R. Dempster, deceased, late of Knoxville, Tenn., by Trust Company of Georgia, executor, Atlanta, Ga.
Original application Sept. 2, 1959, Ser. No. 837,709, now Patent No. 3,214,044, dated Oct. 26, 1965. Divided and this application Feb. 11, 1965, Ser. No. 432,018
3 Claims. (Cl. 220—1.5)

This application is a division of application filed Sept. 2, 1959, Serial No. 837,709, now Patent No. 3,214,044, dated Oct. 26, 1965.

This invention relates to improvements in containers, and more particularly of the order of vehicle bodies or portions thereof.

It is often desirable to load a large container, such as a vehicle body or a portion thereof, separate and apart from the vehicle on which it is to be transported. Such a large container of substantial capacity can be filled when sitting on the ground or on a dock or other surface, after which it is desirable that it be picked up, loaded on the vehicle chassis and transported to a remote point, where it can be unloaded or the contents discharged or removed therefrom. Then, the container can be returned to the point of filling or moved to another suitable point, as desired.

It has been proposed heretofore to provide on a vehicle a tipping frame which is pivotally mounted for raising and lowering movements and which is adapted for receiving thereon one or more large containers for transportation to a remote point. As manufactured heretofore, the tipping frame was provided with a carriage device carrying a bail member constructed so as to engage with a hook or with hooks successively disposed along the length of the bottom of the container, so as to move the container onto or off the tipping frame.

Inasmuch as an elongated container may require several hook stations provided along the length thereof, each of which must be specially formed in the hook bar, this adds somewhat to the complexity of the unit and to the cost of manufacture thereof. There may be other reasons also for not providing the hook stations on the bottom of the container.

One object of this invention is to simplify and improve the construction of the transporting equipment of the character described.

Another object of the invention is to provide for operation of the hook device on the carriage mounted on the tipping frame and to locate suitable means on the container for step-by-step engagement by the hook device in moving the container onto or off the vehicle.

A further object of the invention is to improve the construction of the container by providing for the use of fixed bails spaced at intervals along the length thereof in positions for successive engagement by means on the tipping frame of the vehicle so as to move the container onto or off the latter.

These objects may be accomplished, according to one embodiment of the invention, by providing runners extending lengthwise of the container and supporting the body portion thereof with bail bars or members extending transversely between the spaced runners that are in the form of round rods or bars capable of being engaged by suitable means for shifting the container onto or off the vehicle. Simple and inexpensive rods may be used for this purpose which are welded or otherwise suitably secured to the runner or frame members and held in place securely thereby.

The vehicle is usually and preferably provided with a tipping frame pivotally mounted thereon for swinging movement to raised and lowered positions with respect thereto. Suitable means should be provided on the vehicle as, for example, on the tipping frame when the latter is used, for step-by-step engagement with the bail bars on the container. A carriage device is preferable for this purpose, having a hook member or structure connected therewith for successive engagement with the bails.

This embodiment of the invention is illustrated in the accompanying drawings, in which:

FIG. 1 is a side elevation of a vehicle and container constructed in accordance with this invention;

FIG. 2 is a bottom plan view of the container detached;

FIG. 3 is a diagrammatic view, showing the engagement of the hook member with the bail on the container;

FIG. 4 is a longitudinal sectional view through a portion of the tipping frame and shuttle device, with parts in elevation; and FIG. 5 is a top plan view thereof.

The invention is illustrated as applied to a vehicle chassis of conventional form, wherein the chassis frame is indicated generally at 1 and supported by wheels 2, being power driven in the usual or desired manner under control of the operator within a cab 3. The chassis frame 1 should be of sufficient length to receive thereon and to accommodate the vehicle body or container, and while it is contemplated that a relatively large body be accommodated by the frame, it may comprise one or more portions of the body or respective containers moved successively onto the chassis frame.

Mounted on the chassis frame 1 is a tipping frame, generally indicated at 4, which is provided with opposite side members adapted to be seated directly on the opposite side members of the chassis frame 1 in superposed relation thereto, so that the tipping frame 4 will be disposed directly over the chassis frame 1, capable of being raised or lowered with respect thereto. The tipping frame 4 extends rearwardly of the chassis frame 1 and is pivotally connected therewith at 5. The pivots 5 at opposite sides of the tipping frame 4 join together arms 6 that project downwardly from the tipping frame 4 at the respective opposite sides thereof and brackets 7 depending from the chassis frame 1. This forms a pivotal support for the tipping frame 4 on the chassis frame 1 at the rear end portion of the latter, permitting bodily swinging movement of the tipping frame to different angular positions, as illustrated, for example, in full lines and in dotted lines in FIG. 1.

The tipping frame 4 is adapted to be raised at its front end by suitable power means such, for example, as hydraulic cylinders 8 located at opposite sides of the chassis. One end of each cylinder 8 is pivotally connected at 9 with the chassis frame, while the piston rod of the cylinder is pivotally connected at 10 with the tilting frame 4, or the cylinders may be reversed end-for-end, if desired. Upon expanding movement of the cylinders 8, the tipping frame may be raised with respect to the chassis frame or lowered whenever desired.

A suitable container is illustrated in FIGS. 1 and 2 having a body portion 11 which may vary both as to length and height, as well as with respect to the structure thereof, according to the uses and materials to be accommodated. The body portion 11 is supported upon a subframe 12 which preferably extends throughout substantially the entire length of the body portion. The subframe 12 comprises a pair of runners spaced apart a suitable distance to support the body portion 11 in stable relation and to move the container onto and off the tipping frame 4. In the example illustrated, the runners 12 are spaced apart distances that correspond with the spacing of the side members of the tipping frame 4 for sliding movement of the runners directly onto and off the side members of the tipping frame in bearing relation thereon when in place on the vehicle.

The hook member is provided on a bar 15, the free end of which has a pair of opposite hooks 16, either of which may engage with one of the bail bars 13 according to the direction of movement of the hook bar 15. Provision is made for selectively deflecting one or the other of the hooks 16 out of engagement with a bar 13, as by means of a shuttle 17 which is pivoted at 18 midway between the hooks 16 and extends outwardly therefrom so as to close over the respective hooks, as indicated in full lines and in dotted lines in FIG. 4. The shuttle 17 is constructed so as to embrace the hook bar 15 in the manner that will be apparent from FIG. 5 and thus can flip back and forth to its respective closed positions over the alternate hooks 16.

The hook bar 15 is pivotally supported at 19 on a carriage device, generally indicated at 20. A leaf spring 21 normally tends to hold the hook bar 15 in the raised position shown in full lines in FIG. 4, while permitting it to be deflected to the dotted line position illustrated in FIG. 4 when the hook bar 15 engages at its free end any portion of the container as, for example, the bail bars 13. One end of the leaf spring 21 is fixed to the hook bar 15 while the opposite end of said spring bears upon a support 22 carried by the carriage device 20.

The carriage device 20 comprises a frame structure which is mounted between the side members of the tipping frame 4 and is mounted on the latter by suitable guide means, such as rollers or slides 23 engaged in guideways on the inner faces of the side members of the tipping frame 4. These side members may be formed as channels and would receive therein the rollers 23 for guiding the lengthwise reciprocating movement of the carriage device 20.

The carriage device 20 is adapted to be moved lengthwise of the tipping frame 4 under control of the operator as, for example, by a hydraulic cylinder, generally indicated at 24 in FIG. 5. One end of the cylinder 24 is connected with the carriage device 20 while the opposite end thereof is connected with a spaced portion of the tipping frame 4, so as to effect lengthwise reciprocating movement of the device upon operation of the cylinder under control of and according to the desire of the operator.

In other respects than as herein indicated, the transporting equipment may be contructed as set forth in our prior application, Serial No. 744,107, filed June 24, 1958, of which application Serial No. 837,709 is a continuation-in-part.

In the operation of the equipment, the container 11 is normally filled separate and apart from the vehicle and while sitting on the ground or other supporting surface. When it is desired to pick up and transport the container, the tipping frame 4 is raised to a tilted position with respect to the vehicle chassis, as illustrated in dotted lines in FIG. 1, for example. In this position of the tipping frame, the carriage device 20 should be moved to an extreme position, so as to locate the bail hook bar 15 substantially in the dotted line position. Then, upon backing the vehicle up to the container 11, the hook bar 15 will engage with one of the bail bars 13. By properly manipulating the tilting angle of the tipping frame 4, the operator can engage the rearmost hook 16 with one of the bails 13 which can be detected by an acute sense of hearing and by the feel of the equipment whenever the operator becomes sufficiently adept at handling the same. Then, upon operation of the cylinder 24 to move the carriage 20 forwardly in the tilting frame 4, the front end portion of the container 11 will be drawn up on the tipping frame 4 and it will be retained thereon during another loading step. As soon as the carriage has been moved forwardly of the tipping frame 4 through one stroke of the cylinder 24, the movement of the carriage is reversed.

During this reverse movement, the hook bar 15 will move rearwardly past the forward bail 13 by reason of the shuttle 17 closing over the forward hook 16 in the manner shown in full lines in FIG. 1, thus deflecting the hook bar 15 under the bail 13 due to the yielding action of the spring 21. This allows the hook bar to move rearwardly relative to the container 11 while the latter sits partially supported by the somewhat inclined tipping frame 4 and with is rear end supported on the ground or other supporting surface. As soon as the hook 16 is moved past the next bail 13, bearing upwardly thereagainst by the action of the spring 21, the operator can reverse the direction of movement of the cylinder 24 and thereby engage the hook 16 with the bail 13, and by continuing this action, then move the container forwardly onto the tipping frame 4. The inclination of the tipping frame 4 can be reduced as the container is gradually drawn onto it and as the hook bar 15 is reciprocated step-by-step by engagement with the respective bail bars 13.

As soon as the container 11 is drawn fully onto the tipping frame 4 and the latter is lowered flat upon the chassis frame 1, the container will be held in place thereon during transportation, not only by the hook 16 on the bar 15 but also by suitable engaging means, generally indicated at 25, provided on the tipping frame. In this way the container can be moved to the point of discharge or dumping, as desired.

The container is moved off the tipping frame by reversing the action described. In this reverse movement, the successive bails are engaged step-by-step by the other hook 16 on the bar 15, which engaging movement is controlled by the action of the shuttle 17 in a manner illustrated diagrammatically in FIG. 3. The tipping frame 4 is preferably tilted during the movement of the container off the tipping frame, unless it is to be moved directly onto an elevated support, such as a dock, or onto supporting legs or the like frequently provided on such containers.

While the invention has been illustrated and described in one embodiment, it is recognized that variations and changes may be made therein, without departing from the invention, as set forth in the claims.

We claim:

1. A container of the character described comprising a body portion having a bottom and a subframe beneath the bottom and supporting the body portion, said subframe including a pair of transversely spaced bars extending longitudinally of the container, and a plurality of bail members extending transversely between the spaced bars and fixed thereto and spaced downwardly from the bottom.

2. A container of the character described comprising a body portion having a bottom and a subframe beneath the bottom and supporting the body portion, said subframe including a pair of transversely spaced bars extending longitudinally of the container, and a plurality of bail members extending transversely between the spaced bars and fixed thereto and spaced downwardly from the bottom, said bail members being accessible from beneath the container by a hook device movable lengthwise of the subframe between the bars thereof.

3. A container of the character described comprising a body portion having a bottom and a subframe beneath the body portion, said subframe including a pair of transversely spaced bars extending longitudinally of the container, and a plurality of bail members extending transversely between the spaced bars and fixed thereto and spaced downwardly from the bottom, each of the bail members comprising a relatively straight bar having a mid portion exposed for engagement with a hook device.

References Cited by the Examiner

UNITED STATES PATENTS

| | | | |
|---|---|---|---|
| 3,001,662 | 9/1961 | Herpich | 220—1.5 |
| 3,025,075 | 3/1962 | Batyr | 220—1.5 |

THERON E. CONDON, *Primary Examiner.*

LOUIS G. MANCENE, *Examiner.*

J. B. MARBERT, *Assistant Examiner.*

UNITED STATES PATENT OFFICE
CERTIFICATE OF CORRECTION

Patent No. 3,266,654                                August 16, 1966

William A. Herpich et al.

It is certified that error appears in the above identified patent and that said Letters Patent are hereby corrected as shown below:

In the heading to the printed specification, lines 3 to 7, "William A. Herpich, 739 Hardin Way W., Galion, Ohio, and Samuel E. Harvey, P. O. Box 3127, Knoxville, Tenn., and George R. Dempster, deceased, late of Knoxville, Tenn., by Trust Company of Georgia, executor, Atlanta, Ga." should read -- William A. Herpich, Galion, Ohio, and Samuel E. Havey, Knoxville, Tenn., and George R. Dempster, deceased, late of Knoxville, Tenn., by Trust Company of Georgia, executor, Atlanta, Ga.; said Herpich and said Harvey assignors to Dempster Brothers, Inc., Knoxville, Tenn., a corporation of Tennessee --.

Signed and sealed this 5th day of May 1970.

(SEAL)

Attest:

Edward M. Fletcher, Jr.                   WILLIAM E. SCHUYLER, JR.

Attesting Officer                             Commissioner of Patents